United States Patent
Braungardt et al.

(10) Patent No.: US 10,784,754 B2
(45) Date of Patent: Sep. 22, 2020

(54) METHOD FOR PRODUCING A POLE HOUSING, POLE HOUSING FOR AN ELECTRIC MOTOR AND ELECTRIC MOTOR HAVING A POLE HOUSING

(71) Applicants: BROSE FAHRZEUGTEILE GMBH & CO. KOMMANDITGESELLSCHAFT, WUERZBURG, Wuerzburg (DE); SCHUERHOLZ GMBH & CO. KG STANZTECHNIK, Plettenberg (DE)

(72) Inventors: Norman Braungardt, Grossheirat (DE); Christian Kaiser, Gerach (DE); Alexander Kifer, Mistelbach (DE); Angelo Castrignano, Plettenberg (DE); Stefan Wortmann, Plettenberg (DE)

(73) Assignees: Brose Fahrzeugteile GmbH & Co. Kommanditgesellschaft, Wuerzburg, Wuerzburg (DE); Schuerholz Gmbh & Co. KG Stanztechnik, Plettenberg (DE)

( * ) Notice: Subject to any disclaimer, the term of this patent is extended or adjusted under 35 U.S.C. 154(b) by 136 days.

(21) Appl. No.: 16/180,216

(22) Filed: Nov. 5, 2018

(65) Prior Publication Data
US 2019/0074752 A1    Mar. 7, 2019

Related U.S. Application Data

(63) Continuation of application No. PCT/EP2017/059433, filed on Apr. 20, 2017.

(30) Foreign Application Priority Data

May 4, 2016  (DE) .......................... 10 2016 207 808

(51) Int. Cl.
H02K 21/12    (2006.01)
H02K 15/03    (2006.01)
(Continued)

(52) U.S. Cl.
CPC ............... *H02K 15/03* (2013.01); *H02K 5/04* (2013.01); *H02K 5/10* (2013.01); *H02K 15/14* (2013.01); *H02K 15/062* (2013.01)

(58) Field of Classification Search
CPC .......... H02K 5/04; H02K 15/03; H02K 15/14; H02K 5/10; Y10T 29/49009;
(Continued)

(56) References Cited

U.S. PATENT DOCUMENTS

| 5,426,337 A | 6/1995 | Kobayashi et al. |
| 6,191,516 B1 * | 2/2001 | Froehlich ................. H02K 1/17 310/156.12 |

(Continued)

FOREIGN PATENT DOCUMENTS

| CN | 102820749 A | 12/2012 |
| CN | 204408065 U | 6/2015 |

(Continued)

*Primary Examiner* — Thanh Lam
(74) *Attorney, Agent, or Firm* — Laurence A. Greenberg; Werner H. Stemer; Ralph E. Locher

(57) ABSTRACT

A method for producing a pole housing for an electric motor includes preparing a tube lateral surface from a preferably pre-galvanized sheet metal material and shaping the tube lateral surface to form a cylindrical pole tube from the sheet metal material in such a way that longitudinal edges of the tube lateral surface extended in the tube longitudinal direction face towards one another. The longitudinal edges of the tube lateral surface are joined to one another to form a closed pole tube. A previously-provided cover is form-lockingly and/or force-lockingly fastened as a bearing plate to a front end face of the pole tube and a fluid-impermeable joint is formed between the cover and the pole tube. A pole housing (Continued)

for an electric motor and an electric motor having a pole housing are also provided.

11 Claims, 3 Drawing Sheets

(51) Int. Cl.
*H02K 5/10* (2006.01)
*H02K 15/14* (2006.01)
*H02K 5/04* (2006.01)
*H02K 15/06* (2006.01)

(58) Field of Classification Search
CPC .......... Y10T 29/53161; Y10T 29/49075; Y10T 29/49668; Y10T 29/49908
USPC .............. 310/254.09, 154.35–154.48, 89–90; 29/596, 598
See application file for complete search history.

(56) References Cited

U.S. PATENT DOCUMENTS

| | | | |
|---|---|---|---|
| 7,293,495 B2 | 11/2007 | Dinkel et al. | |
| 9,759,306 B2 * | 9/2017 | Schorpp | F16H 57/023 |
| 2009/0302701 A1 * | 12/2009 | Bhatti | H02K 5/15 310/154.14 |
| 2010/0111730 A1 * | 5/2010 | Peterreins | F04D 13/064 417/423.7 |
| 2010/0281691 A1 * | 11/2010 | Seitter | H01F 7/1607 29/890.132 |
| 2013/0320802 A1 * | 12/2013 | Ihle | H02K 1/145 310/257 |

FOREIGN PATENT DOCUMENTS

| | | |
|---|---|---|
| CN | 204633505 U | 9/2015 |
| DE | 2411621 A1 | 9/1975 |
| DE | 4211869 A1 | 10/1993 |
| DE | 10023313 A1 | 12/2001 |
| DE | 10321863 A1 | 12/2004 |
| DE | 102011012317 A1 | 8/2012 |
| JP | H04112640 A | 4/1992 |
| JP | H0682143 A | 3/1994 |
| JP | 2011058499 | 3/2011 |
| WO | 2012113432 A2 | 8/2012 |

* cited by examiner

METHOD FOR PRODUCING A POLE HOUSING, POLE HOUSING FOR AN ELECTRIC MOTOR AND ELECTRIC MOTOR HAVING A POLE HOUSING

CROSS-REFERENCE TO RELATED APPLICATION

This is a continuation application, under 35 U.S.C. § 120, of copending International Application PCT/EP2017/059433, filed Apr. 20, 2017, which designated the United States; this application also claims the priority, under 35 U.S.C. § 119, of German Patent Application DE 10 2016 207 808.9, filed May 4, 2016; the prior applications are herewith incorporated by reference in their entirety.

BACKGROUND OF THE INVENTION

Field of the Invention

The invention relates to a method for producing a pole housing for an electric motor. The invention further relates to a pole housing produced according to such a method, and to an electric motor equipped with such a pole housing.

Electric motors, in particular compact electric motors, frequently have a so-called pole housing in the inner wall of which are inserted permanent magnets which form the stator and the rotor (armature) of the electric motor.

Pole housings are frequently produced by using the so-called deep-drawing method. The pole housing may also be produced by using the conventional tube-fabrication method in which a tube is shaped to its subsequent pole tube form by, for example, stress-free annealing and multiple drawing. The tube can then be cut to length, for example in a separate machine. The end faces of the tube are then ground. Finally, the tube is galvanized as bulk material for corrosion protection. The disadvantages in that case are, especially, the relatively large number of individual production steps, the subsequent galvanizing and the cost-intensive semifinished product in the form of the tube.

A method for producing a tube whereby the tube is formed from a substantially flat metal sheet is known from German Patent Application DE 103 21 863 A1. In that case the longitudinal edges of the metal sheet are connected to one another by form-locking inter-engaging elements. A form-locking connection is one which connects two elements together due to the shape of the elements themselves, as opposed to a force-locking connection, which locks the elements together by force external to the elements.

German Patent Application DE 100 23 313 A1 discloses a method for fastening a stator in a housing, in which the housing is produced by bending from a sheet metal strip. The end edges of the sheet metal strip brought into contact with one another as a result of the bending process inter-engage while forming a joint gap; the internal diameter of the housing must be greater than the external diameter of the stator.

Such mechanical joint connections generally give rise to geometrical and constructional irregularities resulting from the process. In the crimping or edge-beading process the inter-engaging elements are joined together by plastic deformation, giving rise to ridges. They require additional refinishing. Joining in that way generally offers insufficient protection from ingress of liquid.

International Publication WO 2012/113432 A3 describes a method for producing a gas-tight and liquid-tight pole housing. In order to achieve that, a tube lateral surface produced from a pre-galvanized sheet metal material is joined to form a pole tube by laser welding, with a material joint being formed. A bearing plate is then connected to an end face of the pole tube by a material joint in a second process step.

German Patent Application DE 10 2011 012 317 A1 discloses a method for producing a gas-tight and liquid-tight pole housing. According to the known method a tube lateral surface produced from a pre-galvanized sheet metal material is formed into a cylindrical pole tube by a material joint using laser welding.

U.S. Pat. No. 5,426,337 A describes a pole housing for an electric motor which is fabricated from rectangular sheet metal material. The sheet metal material is formed into a cylindrical tube jacket, with the longitudinally-disposed longitudinal or end edges of the tube jacket being provided with curved contours. In the joined state of the tube jacket the contours of the longitudinal tube edges facing towards one another inter-engage with a form-locking connection. A cover is then fastened to the end face of the pole tube by crimping.

SUMMARY OF THE INVENTION

It is accordingly an object of the invention to provide a method for producing a pole housing, a pole housing for an electric motor and an electric motor having a pole housing, which overcome the hereinafore-mentioned disadvantages of the heretofore-known devices and methods of this general type and in which the method is especially well-suited to the production of a pole housing and, in particular, makes simple, time-saving and low-cost production of the pole housing possible.

With the foregoing and other objects in view there is provided, in accordance with the invention, a method for producing a pole housing for an electric motor, in which a tube lateral surface formed of a sheet metal material is first prepared. In order to prepare the tube lateral surface, referred to hereinafter as the tube jacket, the preferably pre-galvanized sheet metal material is unrolled from, for example, a sheet metal roll (sheet metal coil) and aligned, and then supplied to a punching device to cut off the approximately rectangular tube jacket.

The tube jacket made from the galvanized sheet metal material is then formed into a cylindrical pole tube in such a way that the longitudinal or end edges of the tube jacket (jacket longitudinal edges) disposed in the longitudinal direction of the tube face towards one another. These longitudinal edges of the tube jacket surface are then joined to one another to form a pole tube which is circumferentially closed.

Finally, a cover is fastened in a form-locking and/or force-locking manner to an end face of the tube. As a result, no additional welding device for fastening the cover is required, whereby tooling costs are saved. This advantageously affects the production costs of the pole housing.

Through the use of a tube material formed of a pre-galvanized sheet metal material which is shaped into a cylindrical pole tube and the jacket longitudinal edges of which are then connected together by a material joint, the number of process steps required is advantageously reduced, since subsequent galvanizing and refinishing are both omitted. More rapid production and therefore a higher output volume are therefore possible than in the case of previous methods. Furthermore, costs are advantageously lowered, since, in particular, the tooling costs needed in producing the cover are reduced. This results in an overall reduction in piece costs as compared to pole housings produced by conventional methods. Pole housings are required in large piece numbers especially for the automobile industry, so that low-cost and high-quality production is desirable.

The cover, which serves in particular as a bearing plate of the pole housing for an electric motor, is preferably produced as a prefabricated part. This makes possible the provision of diverse bearing covers, whereas this flexibility is not possible with a deep-drawn pole housing.

In a suitable development, the tube jacket is first supplied to a bending device to be preformed (by rolling, bending, clinching) to an approximately round or cylindrical form and is then supplied to a calibration device to establish the circular shape of the cylindrical pole tube. The desired internal and external diameters of the pole tube can be set in the calibration device. Especially high fabrication accuracy is thereby ensured, benefiting high-volume production of the pole housing.

In an appropriate configuration the longitudinal edges of the tube jacket are connected to one another by a material joint in a following process step, to form a circumferentially closed pole tube. For this purpose the tube jacket, which is rotationally symmetrical (for example, cylindrical with or without feed-in chamfers), is supplied in an appropriate manner to a welding device which connects the longitudinal edges of the galvanized tube jacket in a material joint by using a laser-welded seam. Experience has shown that such connection by a laser-welded seam ensures a reliable and, in particular, fluid-impermeable butt joint of the edges. In addition, through avoidance of overlap of the longitudinal edges, this is also advantageously material-saving.

A further advantage of the laser-welded end edge connection is the comparatively small, concentrated transfer of energy to the pole tube and therefore less thermally-determined distortion. As a result, substantially tighter tolerances of the pole tube can be quickly and simply produced and maintained.

This development of the method further permits, in an especially low-cost manner, a connection by material joint which has high compressive strength while preserving surface quality and, in particular, corrosion protection through the galvanizing, without the need for refinishing. Thus, it has been found that in the course of the laser welding, galvanized material in the region of the end edge connection fuses, and the fused galvanized material, or the welding material permeated therewith, also galvanizes the weld seam and therefore provides it with corrosion resistance. This is explained by the targeted thermal energy transfer to the comparatively narrow joint region between the two longitudinal jacket edges which have been brought into contact with one another.

Moreover, the connection is not effected point by point as in the case of crimping, but evenly along the longitudinal edges of the pole tube. Thus, geometrical and constructional irregularities are avoided and the production of an especially fluid- and gas-tight pole tube is ensured.

In an appropriate configuration, the welded pole tube jacket is supplied, in a following process step, to a punching and/or bending device for forming a number of circumferentially distributed fastening brackets projecting from one end face of the tube. These may be screw brackets or eyes and/or brush-crimping hooks. The fastening brackets are disposed on the tube front face located opposite the cover.

In a preferred embodiment of the method, the cover is fastened to the pole tube by plastic deformation of the tube end, in particular by caulking or crimping. Especially simple and low-cost production of the pole housing is thereby ensured.

The connection, or the fastening area, between the cover and the pole tube is fluid-impermeable, so that a liquid-tight pole housing is provided.

An additional or further aspect of the method provides that a, preferably circumferential, stepped contour with a radial contact face for supporting the cover and with an axial annular wall section is formed in the inner wall of the tube end. The stepped contour, produced, for example, by a machining or reshaping process, ensures exact positioning of the cover on the pole tube during assembly of the pole housing.

In a suitable development, the pole tube is supplied to a stamping device to produce the stepped contour. The stamping device then impresses the stepped contour into the cover end of the tube by using a reshaping process. Especially simple production of the stepped contour is thereby achieved.

In particular, in an advantageous implementation, the axial annular wall section is reshaped radially inwards to retain the cover. In other words, to fix the cover to the pole tube, the cover is first placed in the stepped contour of the tube end. In this case the axial height of the annular wall section is preferably greater than the axial height of the cover, so that the annular wall section projects at least partially beyond the cover in the inserted state. This projecting region of the annular wall section is then reshaped radially inwards, in particular bent over or stamped, in particular by caulking or crimping. The bent-over annular wall section thereby at least partially overlaps the cover, so that secure and fluid-tight retention of the cover on the pole tube is ensured in operation.

The pole housing produced according to the above-described method has especially low production costs. This is especially advantageous to applications in the automotive industry, since the high production volumes required can be achieved especially simply and economically. Against this background, in contrast to conventional methods, a pre-galvanized sheet metal material is used and is processed in an automatic stamping and bending machine. For this purpose the tube jacket sections (blanks) are first unrolled from the sheet metal coil, punched out and shaped (clinched) to a round tubular cross section in a reshaping station. Following calibration of the external and internal diameters of the tube, a strong and fluid-impermeable connection of the longitudinal jacket edges is produced by laser welding. The cover, as the bearing plate, is then fastened in a form-locking and/or force-locking fluid-tight manner to the pole tube by caulking or crimping. With such a pole housing, refinishing is generally not required, or at least the number of refinishing processes is considerably reduced.

The pole housing produced from a pre-galvanized material by a punching and bending process is therefore especially well-suited to an electric motor which is provided, for example, as an actuator for an adjustable part of a motor vehicle.

Other features which are considered as characteristic for the invention are set forth in the appended claims.

Although the invention is illustrated and described herein as embodied in a method for producing a pole housing, a pole housing for an electric motor and an electric motor having a pole housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
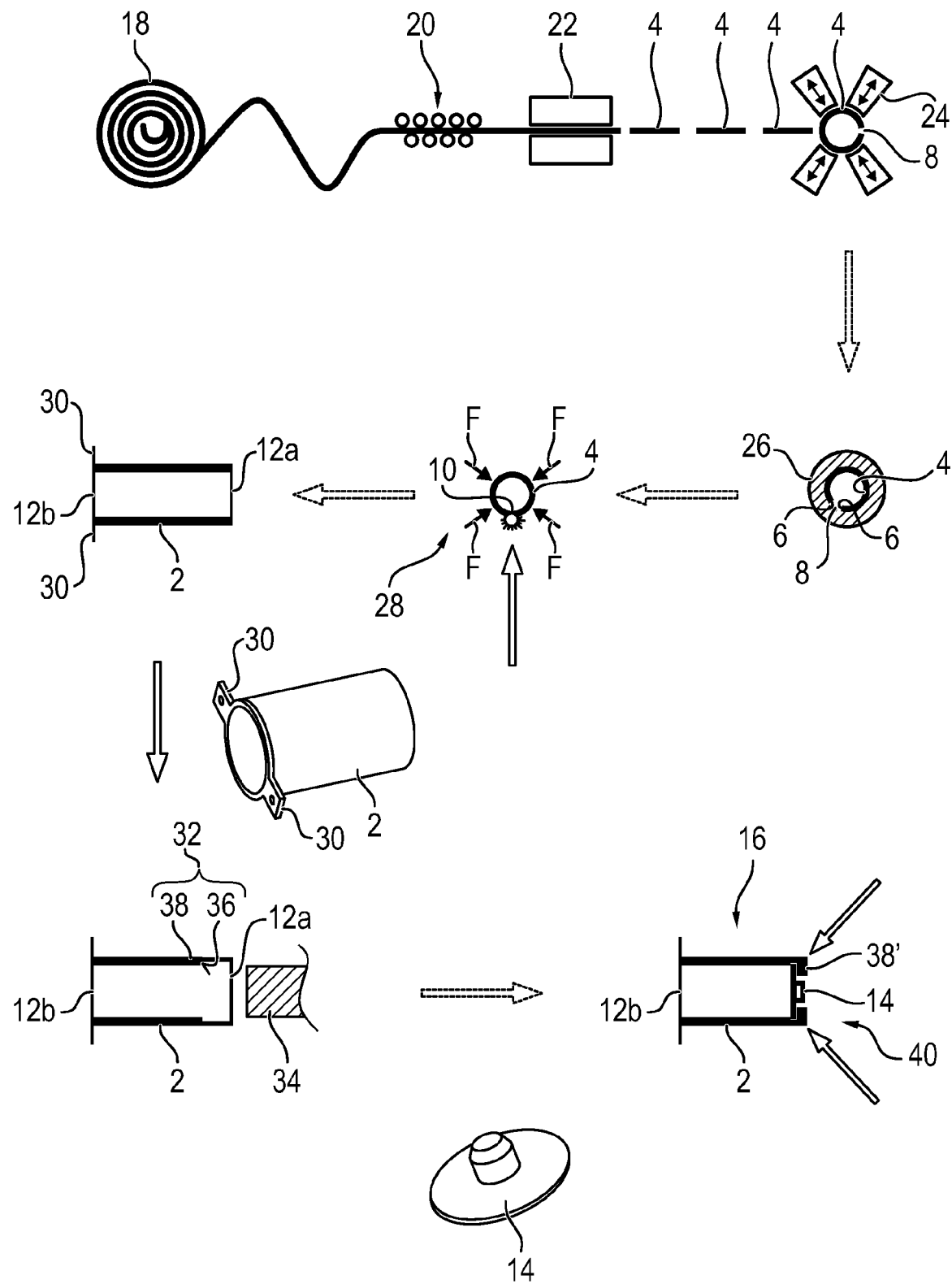
FIG. 1 is a diagrammatic, partly perspective and partly sectional view showing a process sequence for producing a pole housing from a sheet metal material.
Figure 2:
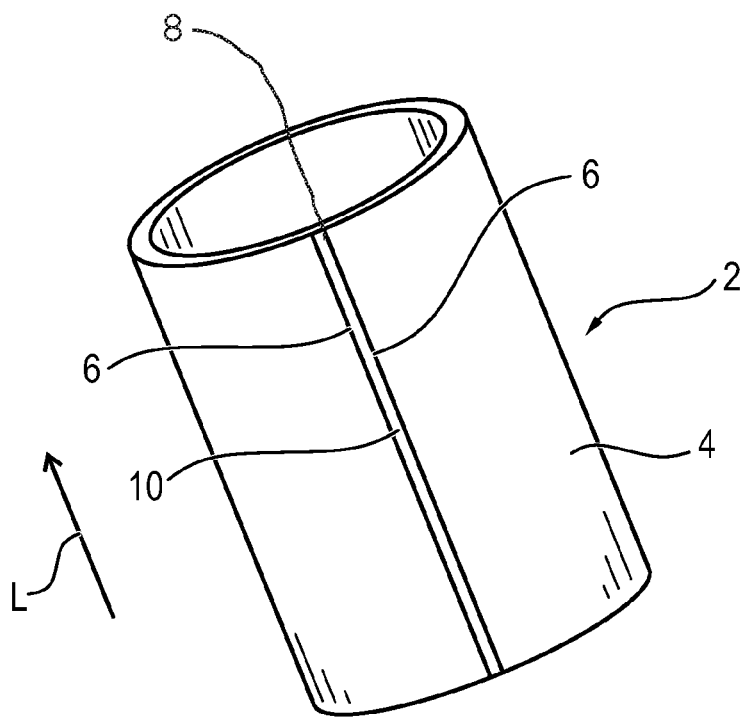
FIG. 2 is a perspective view of a pole tube produced according to the method and having a longitudinal weld seam.
Figure 3:
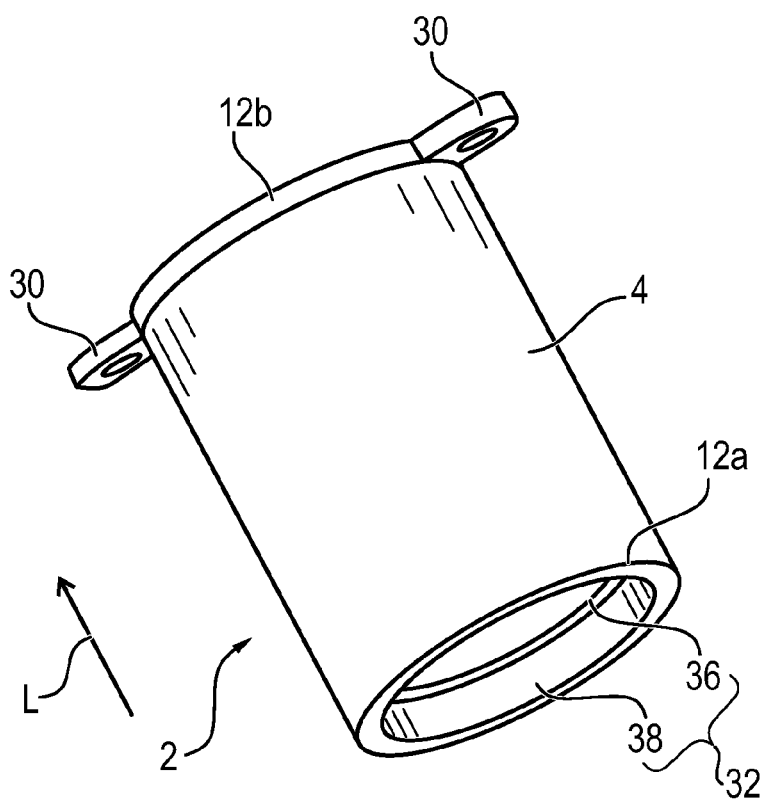
FIG. 3 is a perspective view showing the pole tube as shown in FIG. 2 after the formation of brackets and of a stepped contour.

Referring now in detail to the figures of the drawings, in which corresponding parts are denoted by the same reference symbols and first, particularly, to FIGS. 2-5 thereof, there is seen a pole tube 2 which is produced from a preferably galvanized sheet steel. The tube lateral surface or tube jacket 4 of the pole tube 2 forms two longitudinal jacket edges 6 which are disposed opposite one another in the longitudinal direction L of the tube and are brought together to form a radial gap 8 disposed axially between the two longitudinal jacket edges 6 of the tube jacket 4. The tube gap 8, and therefore the longitudinal jacket edges 6 facing towards one another, are connected with a material joint in a fluid-tight and/or gas-impermeable manner by an axially disposed laser weld seam 10 to form the circumferentially closed pole tube 2.

One of the end faces or tube ends 12a of the pole tube 2 is occluded by a (bearing) cover 14. This cover serves as a housing for one of the bearings supporting the shaft or rotor of an electric motor. In this way a pole housing 16 of the electric motor, closed on at least one side, is provided in a simple and flexible manner. Permanent magnets may be previously mounted on the inside of the pole housing 16 thus produced, as the stator of the electric motor. The electric motor can be used, in particular, as a compact actuator for an adjustable part of a motor vehicle, for example a seat adjuster or window winding mechanism.

FIG. 1 diagrammatically represents a process sequence for producing pole housings 16 from a galvanized material. The starting point is a sheet metal roll or coil 18 on which are rolled multiple layers of pre-galvanized sheet metal with a sheet thickness of, for example, 1.0 mm to 3.0 mm. The sheet metal coil 18 is unrolled and, in a first process step, is aligned continuously in an alignment device 20, with each aligned sheet metal section always forming part of the practically endless strip of the sheet metal roll 18. The strip width of the sheet metal roll 18 corresponds substantially to the subsequent length of the pole tube.

In the next process step the required tube jacket 4 is cut to size from the roll 18 by using a punching device 22. The sheet metal sections thereby produced already correspond to the sheet metal or tube jackets 4 of the subsequent pole tubes 2. The sheet metal section or jacket 4 thus cut to size is then bent to at least approximately the subsequent cylindrical shape in a bending device 24. The punching device 22 and the bending device 24 appropriately form parts of a combined automatic bending and punching machine.

In the following process step the precise shaping of the sheet metal jackets 4 to the ideal, circular cylindrical form is effected by using an automatic alignment machine or a calibration device 26. In this case, the tube contour, that is, the internal and external diameter of the subsequent pole tube 2, is calibrated to yield the practically optimum circular shape.

In the next process step, the laser welding along the mutually aligned axial longitudinal edges 6 of the rotationally symmetrical (for example, cylindrical with or without feed-in chamfers) tube jacket 4 bent from the sheet metal is carried out by using a welding device 28. Prior to and during the welding process the tube jacket 4 is maintained in its calibrated, cylindrical ideal shape by the application of suitable support forces F to multiple points of the tube jacket 4.

In the following process step screw-attachment points and/or brush crimping hooks are formed on the end face (tube end) 12b located opposite the front face 12a of the welded pole tube 2, again by using an automatic bending or bending-and-punching machine (not shown in detail), with corresponding fastening brackets 30 or the like being bent out from the lateral surface 4 in circumferentially exposed locations.

Figure 4:
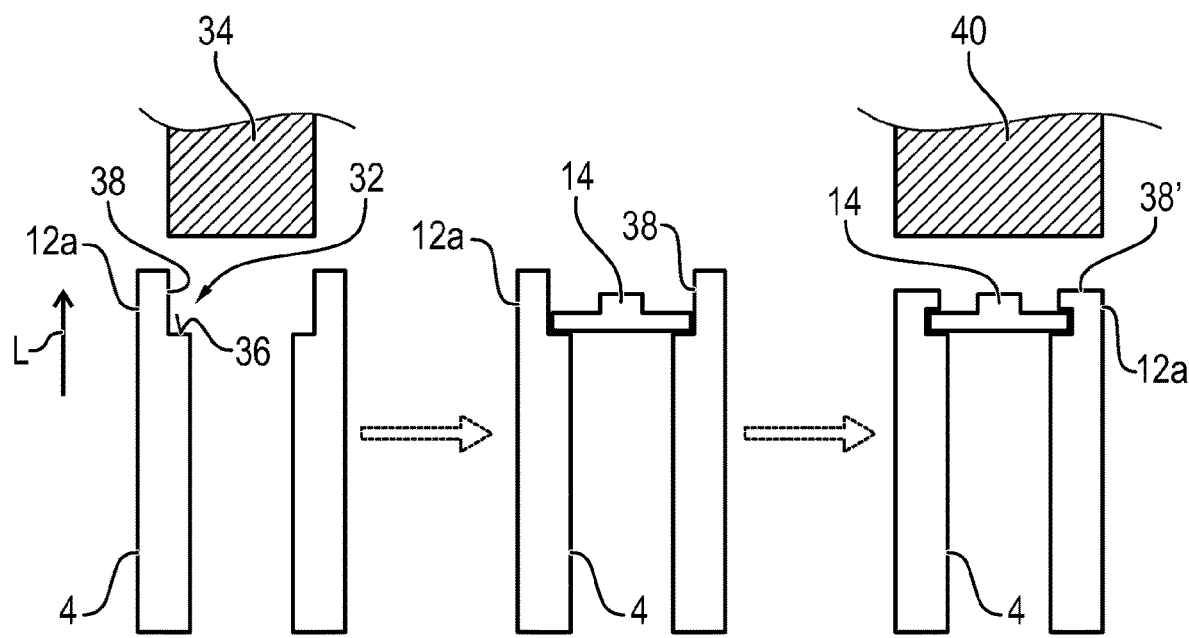
FIG. 4 is a partly sectional and fragmentary view showing a process sequence for forming the stepped contour and fastening a cover to the pole tube.
Figure 5:
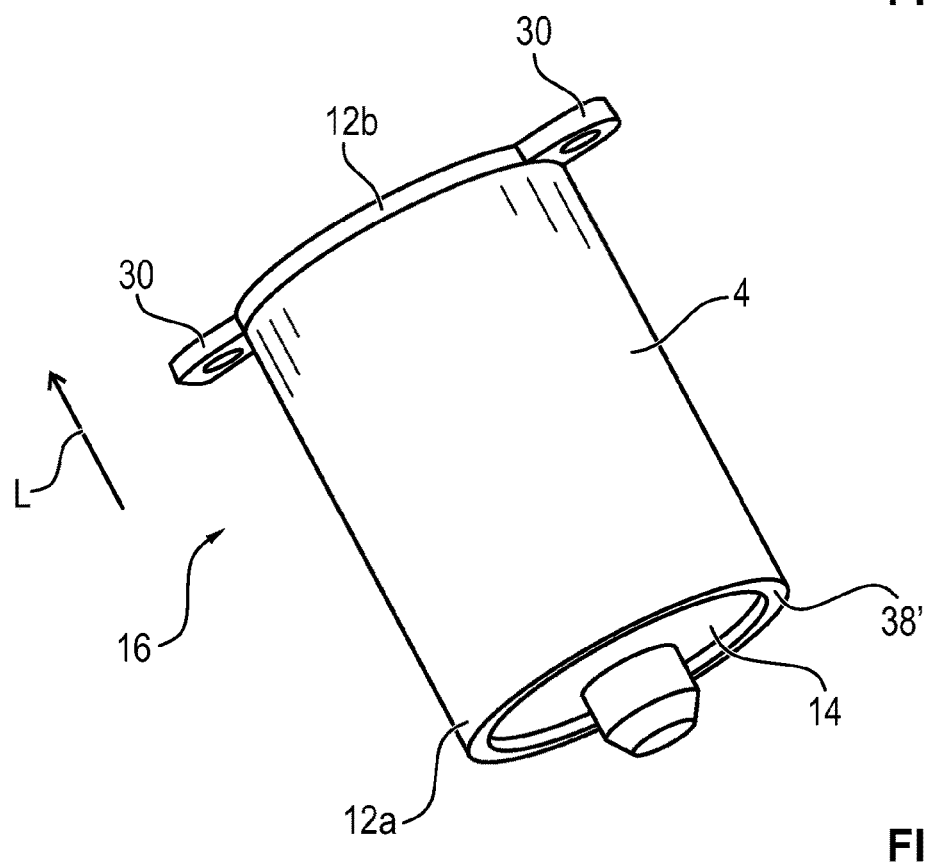
FIG. 5 is a perspective view showing the pole tube as shown in FIG. 2 after the cover has been fastened.

In order to fasten the bearing cover or end plate 14, a stepped contour 32 is first formed in the tube end 12a, that is, in the front face of the pole tube 2 opposite the fastening brackets 30, as is also shown, for example, in FIG. 4. For this purpose the pole tube 2 is placed in a stamping device 34 which may also be, for example, a part of the automatic bending and punching machine including the bending device 24 and the punching device 22. The stepped contour 32 is impressed by the stamping device 32 while forming a radial contact face 36 and an axial annular wall section 38 in the inner wall of the tube end 12a (seen the left section of FIG. 4).

In a further process step (see the center section of FIG. 4) the bearing cover 14 is placed on the contact face 36 so that it is seated substantially entirely inside the annular wall section 38. Finally, the bearing cover 14 is fastened to the pole tube 2 by a crimping device 40. For this purpose the regions of the annular wall section 38 projecting above the bearing cover 14 are reshaped radially inwards (see the right section of FIG. 4). The reshaped (bent-over, stamped) annular wall section 38' therefore at least zonally overlaps the bearing cover 14. A fluid-tight fastening of the bearing cover 14 to the pole tube 2 is thereby achieved. The bearing plate 14 is provided, for example, as a finished or semifinished part.

The invention is not restricted to the exemplary embodiment described above. Rather, other variants of the invention can also be derived therefrom by the person skilled in the art, without departing from the subject matter of the invention. In particular, all of the individual features described in connection with the exemplary embodiment may also be combined with one another in a different manner without departing from the subject matter of the invention.

The following is a summary list of reference numerals and the corresponding structure used in the above description of the invention.

LIST OF REFERENCE SYMBOLS

2 Pole tube
4 Tube jacket/tube lateral surface/sheet metal jacket
6 Jacket longitudinal edge
8 Tube gap
10 Laser weld seam
12a, 12b Front face/tube end
14 Cover/bearing cover/bearing plate
16 Pole housing
18 Sheet metal roll/sheet metal coil
20 Alignment device
22 Punching device
24 Bending device
26 Automatic aligning/calibrating machine
28 Welding device
30 Fastening brackets
32 Stepped contour
34 Stamping device
36 Contact face
38, 38' Annular wall section
40 Crimping device
L Tube longitudinal direction
F Support forces

The invention claimed is:

1. A method for producing a pole housing for an electric motor, the method comprising the following steps:
preparing a tube lateral surface from a sheet metal material;
shaping the tube lateral surface from the sheet metal material into a cylindrical pole tube having a tube longitudinal direction and a front tube end, so that longitudinal edges of the tube lateral surface extended in the tube longitudinal direction face towards one another;
connecting the longitudinal edges of the tube lateral surface to one another to form a closed pole tube;
at least one of form-lockingly or force-lockingly fastening a previously provided cover to the front tube end of the pole tube as a bearing plate; and
forming a fluid-impermeable connection between the cover and the pole tube.

2. The method according to claim 1, which further comprises supplying the tube jacket to a bending device for preforming to an at least approximately circular shape and then supplying the tube jacket to a calibration device to establish a circular shape of the cylindrical pole tube.

3. The method according to claim 1, which further comprises supplying the shaped tube jacket to a welding device and connecting the longitudinal edges of the tube jacket to one another in a material joint forming a laser weld seam.

4. The method according to claim 1, which further comprises supplying the circumferentially closed pole tube to a machine for at least one of punching or bending to form a plurality of circumferentially distributed fastening brackets on an end face of the tube.

5. The method according to claim 1, which further comprises carrying out the step of fastening the cover to the pole tube by plastic deformation of the front tube end.

6. The method according to claim 1, which further comprises forming a stepped contour with a radial contact face for supporting the cover and with an axial annular wall section on an inner side of the front tube end.

7. The method according to claim 6, which further comprises supplying the pole tube to a stamping device and impressing the stepped contour into the front tube end.

8. The method according to claim 6, which further comprises reshaping the axial annular wall section radially inward to retain the cover.

9. The method according to claim 7, which further comprises reshaping the axial annular wall section radially inward to retain the cover.

10. A pole housing for an electric motor, the pole housing comprising:
a tube lateral surface being formed of a sheet metal material and being shaped into a cylindrical pole tube having a tube longitudinal direction and a front tube end;
said tube lateral surface having longitudinal edges extended in said tube longitudinal direction and facing towards one another, said longitudinal edges of said tube lateral surface being connected to one another to form a closed pole tube; and
a cover being at least one of form-lockingly or force-lockingly fastened to said front tube end of said pole tube as a bearing plate, said cover being fluid-impermeably connected to said pole tube.

11. An electric motor, comprising a pole housing according to claim 10.

* * * * *